United States Patent [19]
Larson

[11] Patent Number: 5,282,644
[45] Date of Patent: Feb. 1, 1994

[54] HYDRAULICALLY ADJUSTABLE TIE-ROD FOR AN AGRICULTURAL VEHICLE WITH AN ADJUSTABLE AXLE

[75] Inventor: Roger L. Larson, Waconia, Minn.

[73] Assignee: Ag-Chem Equipment Company, Inc., Minnetonka, Minn.

[21] Appl. No.: 996,290

[22] Filed: Dec. 23, 1992

[51] Int. Cl.<sup>5</sup> .......................... B60B 35/10; B62D 7/20
[52] U.S. Cl. ..................... 280/638; 280/95.1; 180/906; 180/209; 180/155; 180/159; 180/163; 74/586
[58] Field of Search ............... 280/95.1, 638; 180/155, 180/159, 162, 163, 209, 906; 74/586

[56] References Cited

U.S. PATENT DOCUMENTS

| | | | |
|---|---|---|---|
| 1,967,283 | 7/1934 | Brown | 180/209 |
| 1,974,036 | 9/1934 | Du P. Ammen | 280/95.1 |
| 2,173,419 | 9/1939 | Johnson | 180/906 X |
| 2,393,623 | 1/1946 | Ehrenberg | 280/95.1 |
| 2,646,291 | 7/1953 | Chambers et al. | 280/95.1 |
| 2,863,518 | 12/1958 | Pellizzetti | 280/95.1 |
| 4,039,094 | 8/1977 | Grove | 180/906 X |
| 4,079,807 | 3/1978 | Hornagold et al. | 180/145 |
| 4,120,507 | 10/1978 | Miller | 280/95.1 X |
| 4,449,600 | 5/1984 | Telfer | 180/155 X |
| 5,039,129 | 8/1991 | Balmer | 180/906 X |
| 5,121,808 | 6/1992 | Visentini et al. | 180/906 X |

FOREIGN PATENT DOCUMENTS

| | | | |
|---|---|---|---|
| 0220902 | 10/1986 | Japan | 180/906 |
| 0257669 | 10/1989 | Japan | 180/906 |

*Primary Examiner*—Margaret A. Focarin
*Assistant Examiner*—Peter English
*Attorney, Agent, or Firm*—Haugen and Nikolai

[57] ABSTRACT

A variable tie-rod assembly for a steering wheel structure of a row crop applicator. The tie-rod assembly can be adjusted and secured in any position between a minimum and maximum track setting. Thus, a selectively variable track width is provided. Toe-in settings are maintained by implementing a dual-cam arrangement with a locking pin to maintain the steering structure in a forward direction during track width adjustment procedures. The track width setting can be adjusted without the operator ever having to leave the cab of the row crop applicator, wherein the track width can be visually ascertained by observing indicia on the telescoping wheel structure.

15 Claims, 7 Drawing Sheets

Fig.-7 HYDRAULIC SCHEMATIC

HYDRAULICALLY ADJUSTABLE TIE-ROD FOR AN AGRICULTURAL VEHICLE WITH AN ADJUSTABLE AXLE

BACKGROUND OF THE INVENTION

I. Field of the Invention

This invention relates generally to farming row crop applicators having adjustable track widths, and more specifically to row crop applicators having adjustable length tie-rods adapted to the steerable axle.

II. Background of the Invention

Row crop applicators are widely used in the farming industry for applying fertilizer about a field to maximize crop yield. Since different crops are planted in rows having pre-selected row widths, depending on the crop to be grown, the row crop applicator machinery needs to have adjustable track widths such that the tires of the applicator can be driven in the rows defined between the rows of crop. Typical row crop applicators have a track width adjustable between 120 and 152 inches.

Four wheeled row crop applicators have an axle assembly including a tie-rod extending between a pair of steering structures for maintaining a pre-selected toe-in setting. Consequently, when the track width of the steering assembly is adjusted in the longitudinal direction, the length of the tie-rod needs to be adjusted in the longitudinal direction in step therewith. Prior art steering axle assemblies are typically adjusted hydraulically. However, presently available tie-rods typically comprise of a rod telescopingly received within a tubular member, wherein a set pin can be selectively removed therefrom such that the inner rod member can telescope within the tubular member when the track width is adjusted. One or more set pins are then subsequently reinserted through a pair of holes defined in both the tubular member and the telescoping rod to secure the inner rod to the tubular member. These holes are typically defined in 4 inch increments, wherein the operator has to manually insert and remove the pins during the track width adjustment procedure.

One major problem with prior art equipment is that the toe-in setting defined by the wheel assemblies needs to be re-set whenever the track width is established in between a minimum and maximum setting. Further, since the holes in the tie-rod assembly are defined every 4 inches, the operator needs to repeatedly fine tune the track width adjustment until the holes of the inner rod and the outer tubular member are perfectly aligned so that the set pin can be disposed therein. These processes are time consuming, tedious, and potentially dangerous as the operator needs to be positioned beneath the front of the tractor chassis. Further, the track width of the row crop applicator can only be adjusted in 4 inch increments, and is not selectively adjustable to any position between an inner and outer setting. Some crops are planted in rows as narrow as 24 inches, and since the track widths of tractor wheels can sometimes extend up to 12 inches, a 4 inch track width adjustment increment does not provide adequate fine tuning of a desirable track width.

Typically, independent contractors are hired by the farmer to treat a field. The track width of the contractor's row crop applicator is usually not initially appropriate for the intended field to be treated with fertilizer when the contractor arrives to the field. Thus, the independent contractor finds their self requiring to adjust the track width, and resetting the toe-in. Treating several different fields in a day may require setting several different track widths, which is time consuming and inefficient. When the independent contractor is under severe time limitations to treat many fields with fertilizer in a very narrow time window, which can be dictated by the weather or other uncontrollable circumstances, valuable time is lost during the repeated track width adjustments. Thus, the independent contractor stands to benefit from the present invention. However, even the farm owner can benefit from an improved adjustable tie-rod arrangement since the typical farmer plants more than one type of crop, each having different row widths. Hence, having a row crop applicator with a precision adjustable track width would benefit the average farmer as well.

OBJECTS

It is a principle object of the present invention to provide a row crop applicator having a steering structure with an adjustable track width, wherein the tie-rod can be selectively adjusted to any position in a secure arrangement between a first and second track width setting.

Yet a further object of the present invention is to provide a locking arrangement for securing the steering structure to maintain a predetermined toe-in setting during the track width adjustment procedure.

It is a further object of the present invention to provide a row crop applicator having an adjustable tie-rod assembly which does not require the operator to leave the cab of the vehicle to facilitate adjustments of the tie-rod assembly.

Still yet a further object of the present invention is to provide a row crop applicator having an adjustable tie-rod assembly, wherein the tie-rod assembly can be adjusted in the longitudinal direction in an asymmetrical or symmetrical arrangement to facilitate distributing the load of the vehicle in a balanced arrangement upon the wheels.

Other objects, features and advantages of the present invention will become apparent to those skilled in the art through the Description of the Preferred Embodiment, claims, and drawings herein, wherein like numerals refer to like elements.

DESCRIPTION OF THE PREFERRED EMBODIMENT

Figure 1:
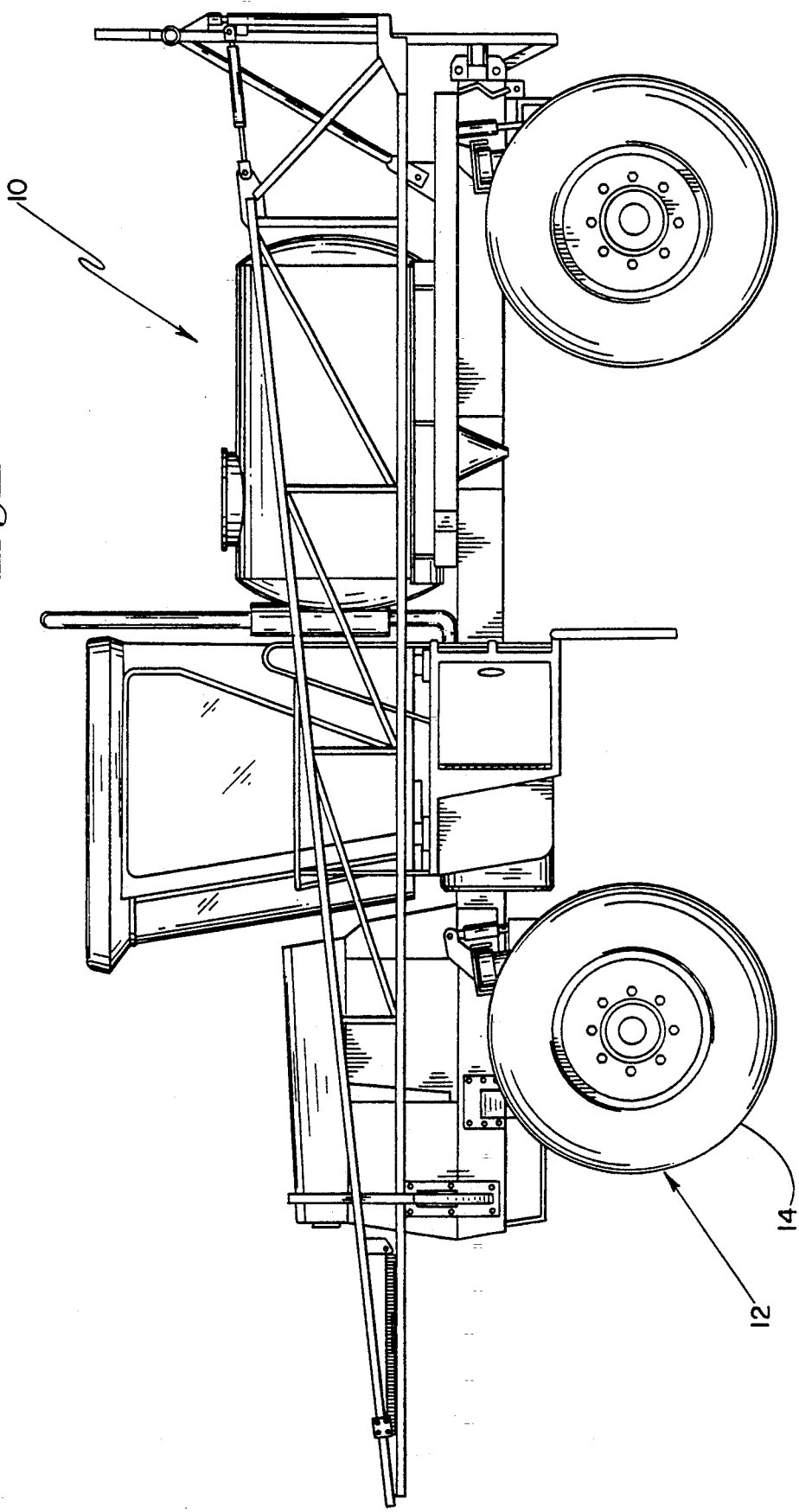
FIG. 1 is a perspective view of a typical four wheeled row crop applicator having an adjustable track width including a variably adjustable tie-rod assembly.

Referring to FIG. 1, a perspective view of a row crop applicator is generally shown at 10. Row crop applicator 10 has a front steering axle assembly generally shown at 12, wherein a pair of wheels 14 define a track width. The track width is adjustable to any position between an innermost and outermost position, typically 120 to 152 inches. This track width is adjustable by the operator using conventional hydraulic systems, which are well-known in the art of row crop applicators.

Figure 2:
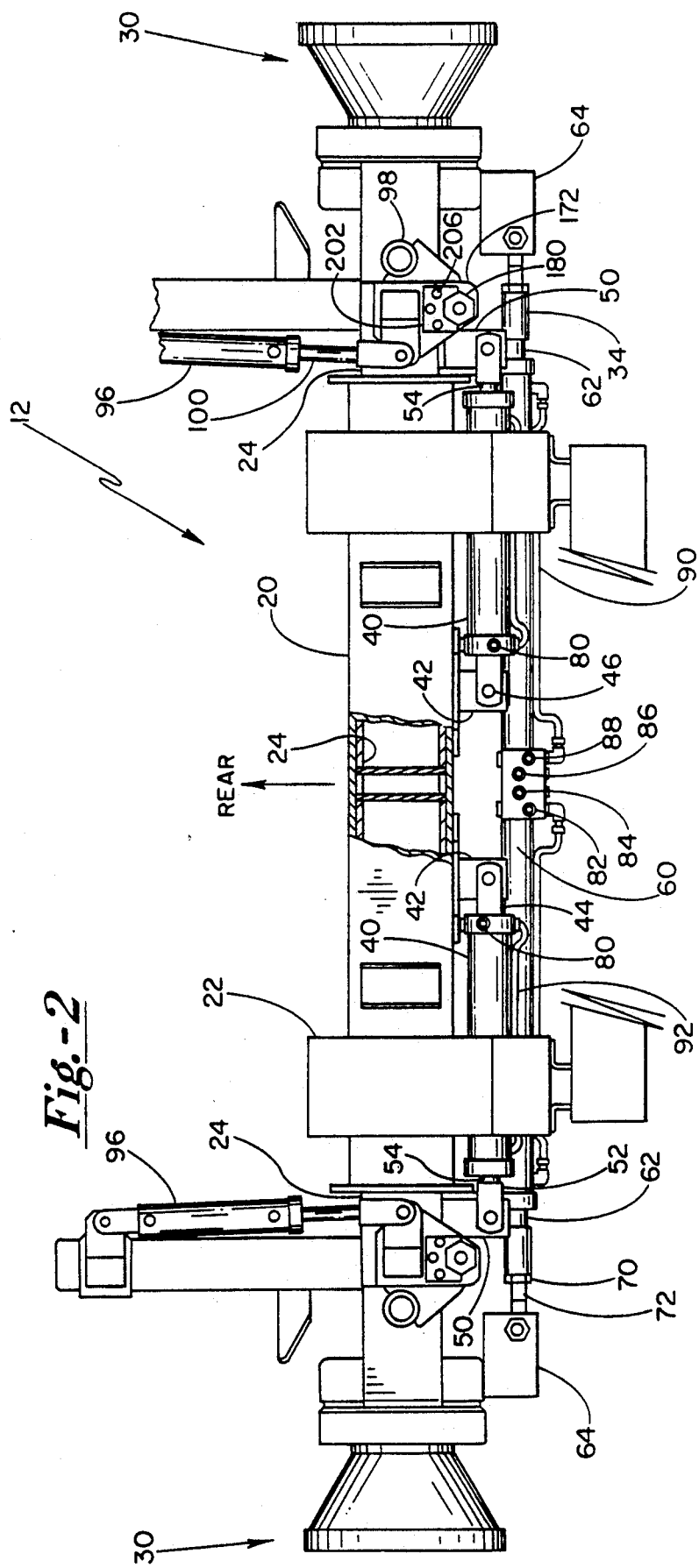
FIG. 2 is a top view of a front steering axle assembly having a variable track width and a variable tie-rod assembly.

Referring to FIG. 2, a top view of front wheel steering assembly 12 is shown, illustrating an improved precisionally variable tie-rod assembly according to the present invention. Front wheel steering assembly 12 includes a rigid tubular axle housing 20 extending laterally across and secured to a tractor chassis 22, typically eight inches in diameter. Axially disposed therein is a pair of telescoping tubular cylinders 24, each extending from approximately a center of axle housing 20 and beyond a respective distal end thereof, each approximately 6 inches in diameter. Each cylinder 24 can be adjusted in the lateral direction from an innermost position, as shown, outwardly in the lateral direction up to approximately 16 inches to provide an overall track adjustment range of 32 inches. However, limitation to this adjustable track width range is not to be inferred.

A steering structure 30 is rotatably coupled to the distal end of each respective tube member 24. Each steering structure 30 is steered in unison with the other, wherein each is maintained relative to the other to define a toe-in setting. The toe-in can be selectively adjusted by adjusting the length of either toe adjusting member 34. Each tubular member 24 can be adjusted in the lateral direction, either independently or in unison with the other, by injecting and removing hydraulic fluid from chambers of a respective hydraulic cylinder 40, which will now be discussed in considerable detail.

The novel features of the infinitely variable tie-rod assembly will now be described in considerable detail. Still referring to FIG. 2, a pair of hydraulic cylinders 40 are shown which are each fixedly attached at an inner end to a bracket 42, wherein bracket 42 is secured and welded to the periphery of axle housing 20. The inner end of each cylinder 40 has a U-shaped bracket 44 extending therefrom and receiving the respective bracket 42. A bolt 46 is selectively disposed through a pair of apertures defined in U-shaped bracket 44 and member 42 to secure bracket 44 to member 42.

The opposing end of each telescoping hydraulic cylinder 40 is securingly coupled to telescoping member 24 via a bracket 50, which is similar to bracket 42, and a U-shaped member 52, which is similar to U-shaped bracket 44, and which is secured to the distal end of an extendable piston rod 54. Piston rod 54 is selectively adjustable in the longitudinal direction within cylinder 40, and is axially disposed therein. By extending piston rod 54 outward in the axial direction, using hydraulic fluid as will be discussed shortly, bracket 52 is moved therewith to impart longitudinal movement in step with tubular member 24.

The adjustable tie-rod assembly is further comprised of a rigid tubular housing 60 having a pair of telescoping piston rods 62 axially defined therein. Each rod 62 is securingly fastened to toe-in adjustment member 34, which in turn is pivotally secured to a respective bracket 64 of respective steering structure 30. Each respective bracket 64 is secured via welding to the respective steering structure 30, which steering structure 30 is pivotally secured to the respective tubular axle member 24. It is particularly noted that both brackets 50 are rigidly secured to the extended portion of the respective telescoping member 24. Thus, as one telescoping member 24 is displaced a unit increment within axle housing 20, both respective rods 62 and rod 54 are adjusted in equal unit length in the longitudinal direction as well. Hence, adjustment of one of the members 24, 54 or 62 causes the other two members to be incremented in step therewith. Again, the toe-in defined by each wheel can be selected by using adjusting member 34, by rotating a hex nut 70 such that a rod 72 can be axially displaced within member 34, wherein hex nut 70 is subsequently resecured.

As will be discussed shortly, piston rod 54 can be axially displaced within respective cylinder 40 by injecting and removing hydraulic fluid, such as via port 80. Similarly, each piston rod 62 can be axially adjusted within tie-rod housing 60 by injecting and removing hydraulic fluid from chambers defined therewithin via ports 82, 84, 86 and 88. A pair of hydraulic lines 90 are provided for communicating hydraulic fluid between a chamber defined on each side of a piston, which piston is positioned within housing 60 and about respective piston rod 62. Similarly, a hydraulic passageway 92 is provided for communicating hydraulic fluid between a pair of chambers defined on each side of a piston integrally defined within respective cylinder 40, each piston being defined about a respective rod 54.

Figure 3:
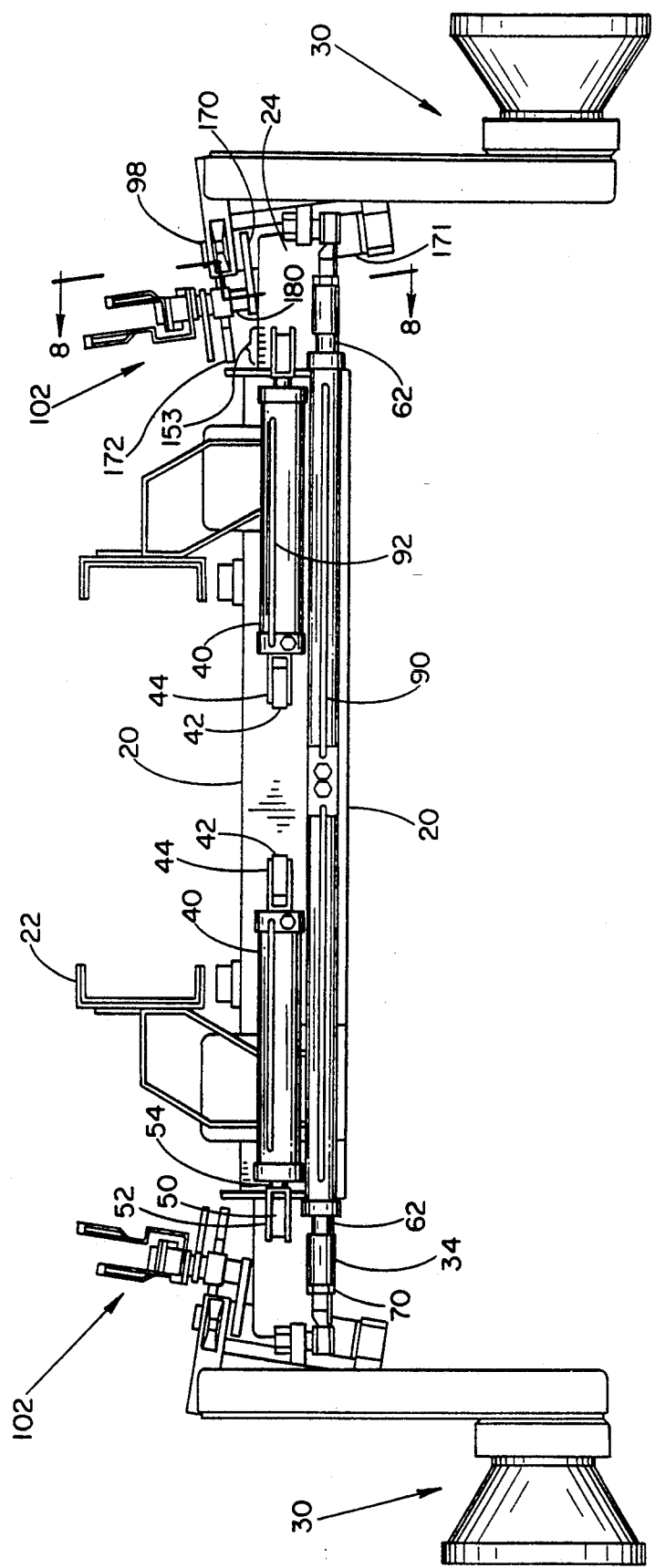
FIG. 3 is a front view of the front wheel steering structure assembly shown in FIG. 2 illustrating the arrangement of the hydraulic cylinders in relation to the steering axle assembly and the telescoping tie-rod assembly.

Steering is accomplished by a pair of hydraulic cylinders 96, which cause each respective steering assembly 30 to pivot about a king pin 98, and with respect to the distal end of respective tubular member 24, as shown in FIG. 3. Each hydraulic cylinder 96 includes an axially received piston rod 100 which is displaced in a longitudinal direction, in unit steps with one another, to facilitate a steering structure, which is well-known in the art.

Referring to FIG. 3, a novel locking arrangement is shown at 102, wherein sectional view 8—8 is shown and will be described shortly. Locking structure 102 provides a unique arrangement for selectively locking each respective steering structure 30 during a track width adjustment procedure with respect to tubular member 24 when each steering structure 30 is facing forward such that vehicle 10 is driving straight. Locking structure 102 will be described shortly.

Figure 4:
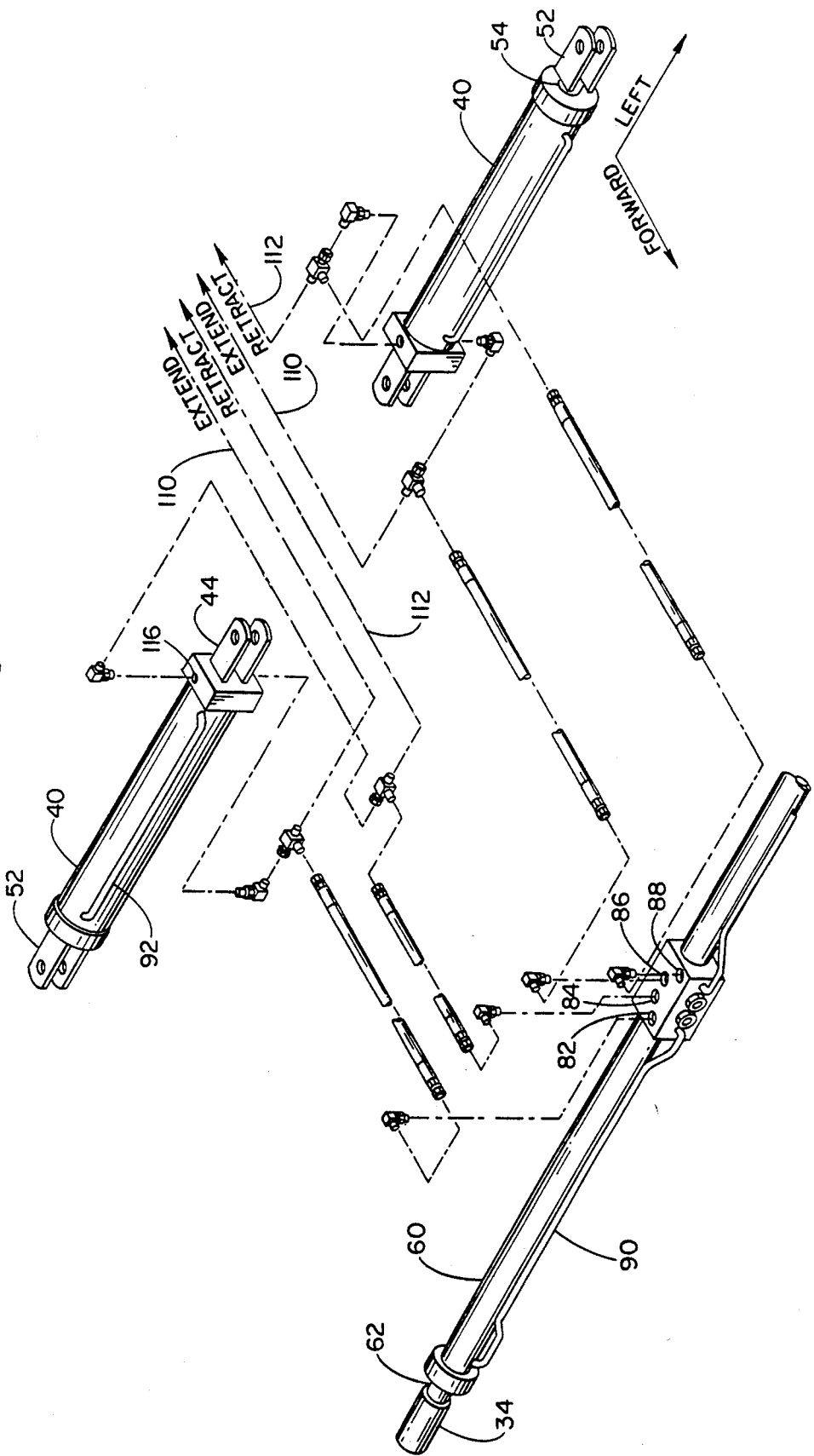
FIG. 4 is an exploded perspective view of the hydraulic network for controlling the telescoping cylinders and the telescoping tie-rod, each which are simultaneously hydraulically extended or retracted during the track width adjustment procedures.

Now referring to FIG. 4, the hydraulic arrangement for controlling the extension of cylinder rods 54 within cylinders 40, and tire-rods 62 within tie-rod housing 60 will now be discussed in considerable detail. As shown, hydraulic fluid is injected or extracted via a first pair of passageways 110, and a second pair of passageways 112. To impart longitudinal movement of piston rod 54 and extend bracket 52 from the cylinder housing 40, hydraulic fluid is injected via respective line 110 into a lower aperture defined in the proximal end of respective cylinder 40. Concurrently, hydraulic fluid is removed via an aperture 116 defined in an upper proximal end of respective cylinder 40. The lower and upper apertures of each cylinder 40 communicate hydraulic fluid to chambers defined on opposite sides of a piston defined about each respective piston rod 54, as will be described shortly in reference to FIG. 5. Similarly, to retract rods 54 and 62 within the respective housings, fluid is injected and retracted in opposite directions via lines 110–112.

To increase the track width of row crop applicator 10, hydraulic fluid is injected via a respective line 110 into the respective cylinder 40, and removed via line 112. Also concurrently, hydraulic fluid is injected into the respective half of tie-rod housing 60 via apertures 82 and 88, depending on which, or both, steering assemblies 30 are to be extended, and simultaneously retracted from apertures 84, 86.

For instance, if only the right steering structure is to be extended, hydraulic fluid is only injected into and removed from the right cylinder 40, and the right half of tie-rod 60. If a symmetrical adjustment is desired, equal amounts of hydraulic fluid are injected and removed from each of the respective chambers of each cylinder 40 and tie-rod housing 60 to get an equal adjustment of each steering assembly 30 in reference to a mid-section of housing 20. As shown in FIG. 4, a variety of hydraulic couplings are provided for adapting hydraulic lines between splitters, and to each of the ports defined in cylinders 40 and tie-rod housing 60.

Because the longitudinal adjustments of each rod 54 within cylinder 40, and of tie-rod rods 62 within housing 60 is hydraulically driven, an equal amount of hydraulic fluid is injected into the chamber on one-half of the internal piston as is removed from the chamber opposite the piston in a closed system arrangement.

Figure 5:
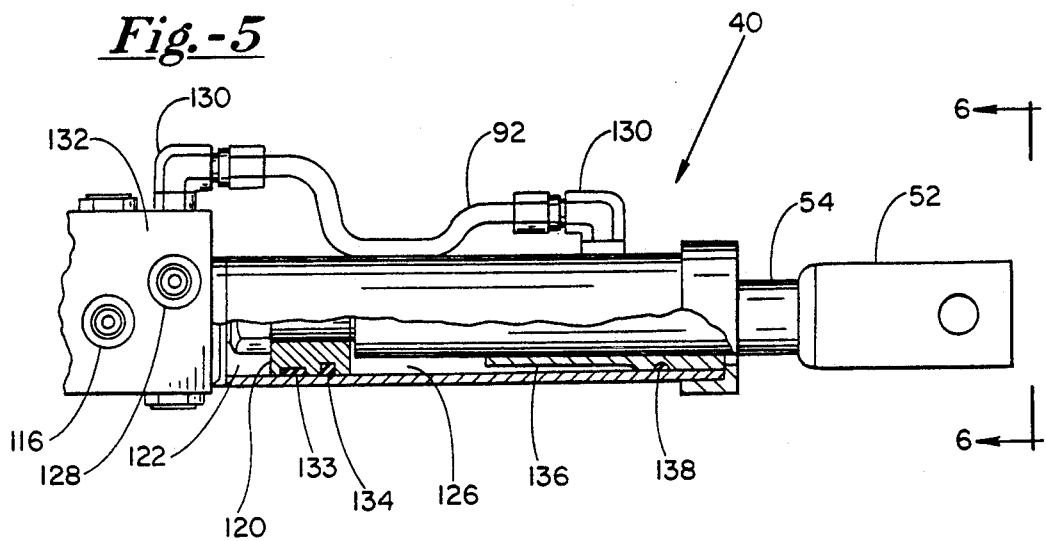
FIG. 5 is a partial sectional view of one hydraulic cylinder illustrating the adjustable piston in the retracted position.
Figure 6:
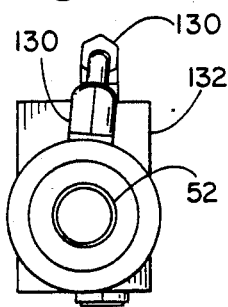
FIG. 6 is an end view taken along line 6—6 shown in FIG. 5.

Now referring to FIG. 5, cylinder 40, which is similar to the pistons defined in tie-rod housing 60, will be described in considerable detail. Cylinder 40 has disposed therein a piston 120 defining a first chamber 122, which is in communication with port 116, and a second chamber 126 which is isolated from first chamber 122. Second chamber 126 is in communication with port 128 via hydraulic passageway 92. A pair of 90 degree couplings 130 are provided for adapting conduit 92 to cylinder 40 in a low profile arrangement. A bulk head 132 is provided for defining each opening 116 and 128, and which is secured to the outer housing of cylinder 40. A wearband 133 is provided about piston 120, as is a seal 134. A rod spacer member 136 is secured within cylinder 40 and chamber 126 for defining a maximum extension of piston 120. A seal 138 is provided about stop spacer member 136 for sealing hydraulic fluid within chamber 126 in combination with seal 134.

By injecting hydraulic fluid into port 116, and consequently into first chamber 122, and simultaneously removing hydraulic fluid from second chamber 126 via passageway 92 and port 128, longitudinal movement of piston rod 54 is generated. Hydraulic pressure developed in first chamber 122 urges piston 120 to slide in the axial direction, towards the right to extend piston rod 54, and respective bracket 52 away from the distal end of cylinder 40. This process is done to impart longitudinal movement of the respective tubular housing member 24 such that axle member 24 is extended outward from chassis 22 to increase the track width of tractor 10. The other cylinder 40 may be similarly extended, simultaneously if desired, if it is desired to symmetrically increase the track width. However, either cylinder 40 can be individually controlled with the respective tubular member 24, which will be described further shortly.

Conversely, piston rod 54 can be retracted within cylinder 40 by removing hydraulic fluid from first chamber 122 and injecting hydraulic fluid into second chamber 126 in a similar fashion. When piston rod 54 is retracted within cylinder 40, the respective tubular member 24 is retracted within axle housing 20 in unit step therewith.

Figure 7:
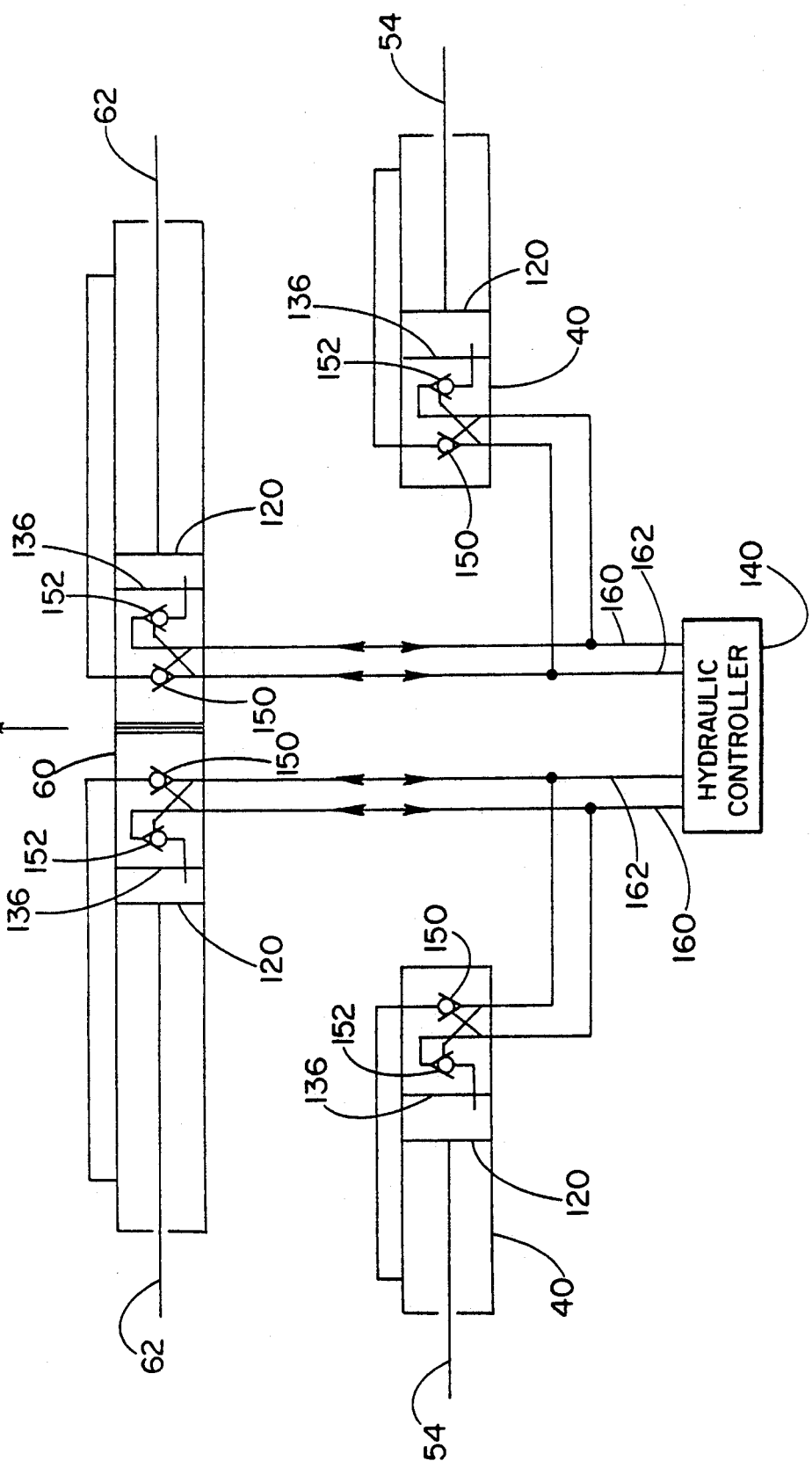
FIG. 7 is a schematic view of the hydraulic system for controlling each of the track adjust cylinders and each tie-rod cylinder, each half capable of being controlled either independently or in unison with the other half.

Referring now to FIG. 7, a schematic lay out of the hydraulic system is illustrated to further illustrate how hydraulic fluid is communicated between a hydraulic controller and source 140 and tie-rod housing 60, and each track adjust cylinder 40. As schematically illustrated, either the left half, or right half, or both tie-rod cylinder 60 and track adjust cylinders selectively can be controlled. To extend one tie-rod cylinder rod 62 and the respective piston rod 54 of the corresponding cylinder 40, hydraulic fluid is communicated from hydraulic controller 140 to a pair of check valves 150. Consequently, a pilot valve opens a corresponding second check valve 152 such that hydraulic fluid can be injected into one chamber and removed from the other chamber of each cylinder to impart longitudinal movement of the piston rods within each respective housing. Thus, the corresponding piston rod 54 and 62 will be incremented in unit step with one another. To retract each respective piston rod 54 and 62, hydraulic fluid is communicated to each check valve 152, which causes the pilot valve to unlock the corresponding check valve 150, such that hydraulic fluid can be communicated in the opposite direction. Each rod is locked in place when fluid is not communicated due to check valves 150 and 152 being closed.

Still referring to FIG. 7, either or both sets of tie-rod cylinders and track adjust cylinders can be selectively adjusted in the longitudinal direction in any position between an innermost and outermost setting. Again, each tie-rod cylinder rod 62 and track adjust cylinder rod 54 are adjusted in step with the respective tubular member 24. Thus, the overall length of the tie-rod assembly will be extended or reduced equally to the length adjustment of the axle housing formed by housing 20 and each tubular member 24. The track width can be ascertained from the cab of vehicle 10 by observing graduated indicia 153 defined on a surface of each rod 24 projecting from housing 20. (See FIG. 3). Hydraulic controller 140 resides in the cab of the row crop applicator vehicle 10, wherein hydraulic solenoid switches are implemented to electronically control the communication of hydraulic fluid via hydraulic lines 160 and 162 to each of respective check valves 152 and 150. Thus, the hydraulic assembly can be remotely controlled within the cab by the operator.

Figure 8:
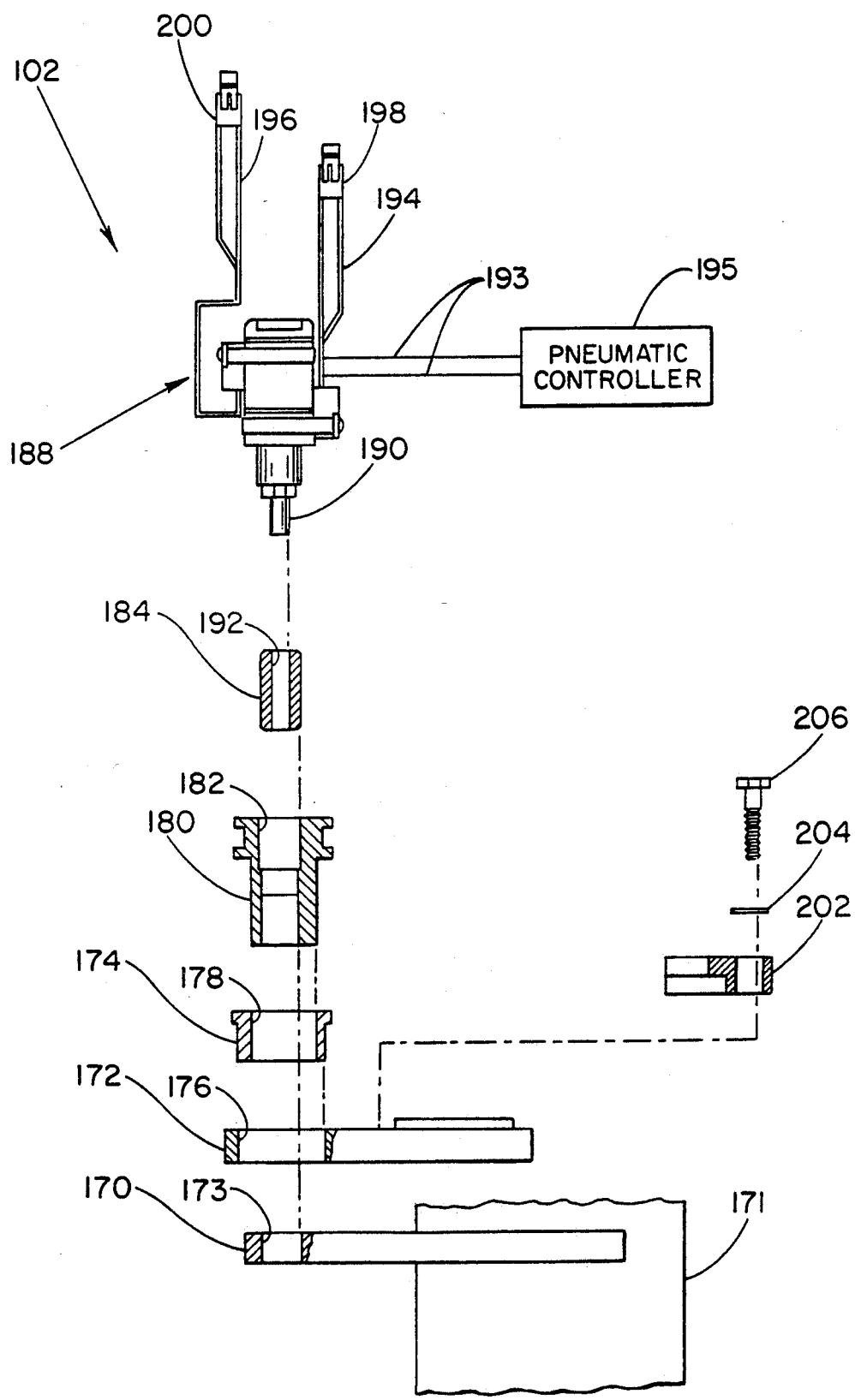
FIG. 8 is an exploded front view of the steerable wheel locking arrangement including a pair of eccentric cams which are rotatably secured with respect to one another by a pin inserted therein to lock the wheels.

Now referring to FIG. 8, sectional view 8—8 shown in FIG. 3 of locking structure 102 will now be described in considerable detail. A first plate 170 having an aperture 173 and a second plate 172 having an aperture 176 are illustrated, wherein first plate 170 is secured about the tubular sleeve 171 which receives king pin 98. This tubular sleeve 171 is an integral part of tubular member 24, as shown in FIG. 3. Plate 170 is stationary in that steering rotation occurs about it. Second plate 172 is part of the steering structure 30, as shown in FIGS. 2 and 3. Second plate 172 is rotatable about the king pin. A steering lock hub 174 is rotatably received within an aperture 176 defined through a distal end of plate 172. Steering lock hub 174 has an eccentrically defined opening 178 for receiving a steering lock sleeve 180 as shown. Steering lock sleeve 180 also has an eccentrically defined opening 182 for receiving a lock pin 184.

An pneumatic cylinder 188, which is remotely controlled from within the cab of vehicle 10, has a extendable shaft 190 which is received within a tubular opening 192 of locking pin 184. Consequently, when pneumatic cylinder 188 is engaged, shaft 190 will project therefrom and project locking pin 184 into both opening 182 of steering lock sleeve 180, which is received in opening 178 of steering lock hub 174, and into aperture 173 but only when each eccentrically shaped opening is aligned with one another and opening 173. Being as the setting of proper toe-in establishes the rotatable relationship of plate 170, which is stationary, and of plate 172 which rotates with steering or the setting of toe-in, the relationship of the holes in said plates 170 and 172 needs to be adjustable in order for a common axis to be established. Such alignment only occur when each of the steering structures 30 of tractor 10 are facing straight and in the forward direction.

Pneumatic cylinder 188 will attempt to project locking pin 184 into each opening 182 and 178 until the operator properly aligns each steering assembly 30 in a forward direction. This feature is provided such that the predetermined toe-in adjustment will not be disturbed from track adjustment forces overriding the steering cylinders during a subsequent adjustment of the track width, as previously described, even when the track width is adjusted to define the track width between the minimum and maximum settings. Pneumatic cylinder 188 is controlled via a pair of air lines 193, which selectively couple air between a control source 195, which is remotely controlled from within the cab of the vehicle 10.

Feedback is provided to the operator in the cab via a first conductor 194 and a second conductor 196 to a respective LED 198 and 200. For instance, first LED 198 can be a green LED which is illuminated when shaft 190 is in the retracted position, indicating that the steering assembly is not locked. Similarly, LED 200 can be a red LED which is illuminated when shaft 190 is extended, thus positioning locking pin 184 within openings 182 and 178, to indicate the steering assembly is locked. A hex stop 202 is secured to plate 172 and is provided for aligning and securing steering lock hub 174. A washer 204 and a hex bolt 206 is provided for securing hex stop 206 to second plate 172. Hex stop 202 and cam 180 are illustrated in FIG. 2 with pneumatic cylinder 188 removed.

In summary, a selectable tie-rod assembly has been described in considerable detail which can be extended or retracted in unison with the steering axle assembly which establishes the track width. Since the tie-rod assembly is selectively adjustable to any position between a maximum and minimum track width position, the operator can set a precise track width which is appropriate for the field to be treated. Further, the operator need not leave the cab to lock and unlock telescoping members of a tie-rod arrangement, which is time consuming, frustrating and inefficient, and sometimes dangerous. Either half of the tie-rod assembly can be extended or retracted individually or simultaneously, to compensate for the loading of the tractor as well. Thus, symmetrical or asymmetrical adjustment of the tie-rod assembly can be provided. A further feature of the present invention is the unique locking feature to lock the steering structure in a forward position while adjusting the track width to any track width setting. The exact track width can be readily observed from the cab of the tractor by observing the indicia disposed on the extendable piston rod of the wheel assembly.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

I claim:

1. A vehicle, comprising:
   (a) a chassis;
   (b) a steerable axle assembly coupled to said chassis and having a variable steering position for steering said vehicle, said steerable axle assembly being extendable in a longitudinal direction between a first and second position;
   (c) tie-rod means coupled to said axle assembly for maintaining a toe-in relationship of said steerable axle assembly, said tie-rod means having means for adjusting a length of said tie-rod means in the longitudinal direction as said steerable axle assembly is extended from said first to said second position;
   (d) drive means coupled to said steerable axle assembly for extending said axle assembly in the longitudinal direction between said first and second position; and
   (e) locking means for selectively locking said steerable axle assembly in a fixed first steering position as said steerable axle assembly is extended.

2. The vehicle as specified in claim 1 wherein said tie-rod means comprises a first housing having a first and second member adjustably coupled thereto, one said member being disposed at each end of said first housing, wherein said adjusting means adjusts the extension of at least one said member relative to said first housing as said steerable axle assembly is extended from said first to said second position.

3. The vehicle as specified in claim 2 wherein said first housing comprises a tubular member and each said first and second members comprises an extendable piston rod axially and slidably disposed therein such that extension of either said piston rod extends the length of said tie-rod means.

4. The vehicle as specified in claim 3 wherein said steerable axle assembly comprises a second tubular housing having a third and fourth member received in a telescoping arrangement therewithin, wherein said tubular member of said tie-rod means is secured to said second tubular housing.

5. The vehicle as specified in claim 3 wherein said drive means is also coupled to said tie-rod means for imparting longitudinal movement of at least one of said piston rods within said tubular member.

6. The vehicle as specified in claim 5 wherein said drive means imparts longitudinal movement of at least one of said piston rods within said tubular member while concurrently extending said axle assembly.

7. The vehicle as specified in claim 2 wherein said adjusting means adjusts the extension of both said first and second members to a corresponding position as said steerable axle assembly is extended from said first to said second position.

8. The vehicle as specified in claim 1 wherein said drive means is comprised of a hydraulic drive arrangement.

9. The vehicle as specified in claim 1 wherein said locking means selectively locks said steerable axle assembly such that said vehicle is steered straight forward.

10. The vehicle as specified in claim 1 further comprising control means for selectively controlling said locking means.

11. The vehicle as specified in claim 10 wherein said control means further comprises feedback means for indicating a status of said locking means.

12. The vehicle as specified in claim 1 wherein said locking means comprises a pair of cams rotatable with respect to one another and coupled to said steerable axle assembly, each having an opening defined therethrough, and a set pin disposable through each said cam openings only when said steerable axle assembly is in said first steering position.

13. The vehicle as specified in claim 12 wherein said control means comprises a pneumatic cylinder attached to said set pin for selectively advancing said set pin into each said opening of each said cam.

14. The vehicle as specified in claim 12 wherein at least one said opening in said respective cams is eccentrically defined therein.

15. The vehicle as specified in claim 12 wherein both said openings in said respective cams are eccentrically defined therein.

* * * * *